Sept. 9, 1930.  M. E. CHENEY  1,775,273
LIQUID LEVEL GAUGE
Original Filed Oct. 25, 1928
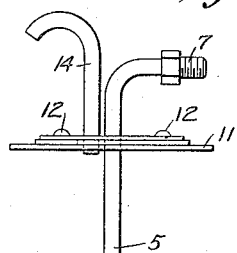
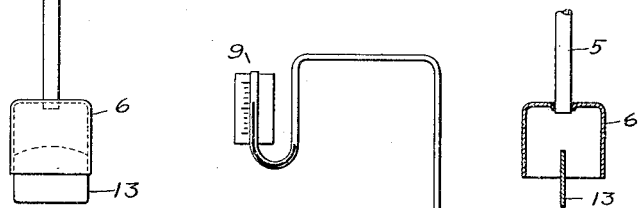
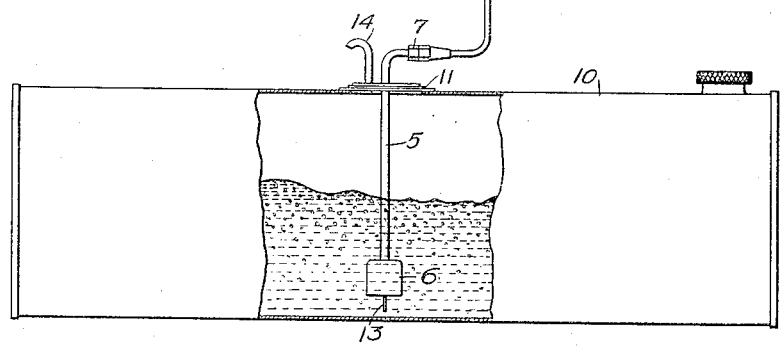
Inventor
Moses E. Cheney
By Attorneys
Nathan & Bowman Patented Sept. 9, 1930

1,775,273

UNITED STATES PATENT OFFICE

MOSES E. CHENEY, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

LIQUID-LEVEL GAUGE

Original application filed October 25, 1928, Serial No. 228,578. Divided and this application filed May 19, 1928. Serial No. 278,954.

This application is a division of the pending application Serial No. 228,578, filed October 25, 1927.

The invention relates to an improvement in liquid level gauges and particularly to that type of gauge used to measure the quantity of gasoline in the tank of the ordinary motor cars.

One of the determining factors in this invention lies in the fact that the fluid in the tank of a vehicle is constantly surging about the tank causing the liquid near the surface and a considerable depth therefrom to become aerated. This agitation is caused partly by the unevenness of the road upon which the vehicle is traveling and also by the variations in the speeds of travel and changes in the direction of travel.

The instrument consists of a unitary structure readily adapted to be inserted into a tank and having suitable connections to a gauge mounted on the dashboard of car and within the range of vision of the operator. The device is preferably constructed from a short length of metal tubing having one end formed with a bell-shaped receptacle to be inserted into the tank. Vertically arranged within the receptacle and projecting substantially below the same is a web like bar or baffle plate which further aids the agitations of the liquid as it surges to and fro within the tank. The primary purpose however, of the baffle plate is to offer an obstruction to the aerated fluid as it moves beneath the bell or cup shaped receptacle, thereby momentarily stopping the substantially horizontal movement of the bubbles of air which immediately rise and become entrapped within the bell housing.

Gauges of this type heretofore used were not entirely successful in that the means provided to replenish the air within the bell ofttimes became defective due to clogging of the sieve or air tubes employed as the case may be. This invention, as will be apparent, is designed to take advantage of the moving liquid to supply air to the gauge without the aid of complicated devices or other external means, resulting in a very simple, inexpensive, and highly accurate fitting.

It is important that the pipe line to the gauge be kept free from liquid at all times since the accuracy of the instrument depends solely on the differential in the air pressure which is caused by the changes in the liquid level of the tank. This invention proposes a means whereby the line is automatically cleared at all times since new air is constantly being introduced into the bell without further attention or care of any kind.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 represents a tank partly filled with fluid and showing the improved device submerged therein with its connections to a gauge of a common form. Fig. 2 is an enlarged view of the device incorporating this invention. Fig. 3 is a sectional view of the bell receptacle showing more clearly the relative position of the baffle plate.

Referring more particularly to Fig. 2 of the drawing, the tank fitting is comprised of a short length of metal tubing 5 provided at its lower end with an air bell 6 which may be soldered thereon in the usual manner or which may be made integral with the tube 5 by expanding the tube by a conventional method, such as for example, by a spinning, drawing, or pressing operation. The other end of the tube is provided with a threaded end portion 7 whereby the line 8 leading to the gauge 9 may be readily connected thereto. The tube and bell is supported within the tank 10 by means of the cover plate 11 which may be removably fastened to the tank as by means of the screws 12.

Within the bell 6 and projecting substantially below the same is a baffle plate or web member 13 which offers an obstruction to the surging liquid and deflects the air bubbles into the bell housing. It has been found that the fitting functions more accurately when located a substantial distance from the ends of the tank as shown in Fig. 1 and this is due primarily to the fact that the baffle plate 13 obstructs the aerated fluid when it moves in either direction. However, the device works accurately wherever placed in the tank as the baffle plate deflects enough air to the bell to keep the line to the gauge 9 free from liquid. A vent pipe 14 is preferably employed to supply air to the tank to compensate for the displacement of fluid withdrawn during the normal running or operation of the car.

From the foregoing it will be seen that the device is simple in construction, automatically operated and highly accurate in its performance. The fluid in the tank creates a pressure on the air entrapped within the bell directly proportional to the quantity of fluid in the tank, this pressure is then transmitted to the gauge 9 through the line 8 where a reading may be affected.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention I claim as new and desire to secure the following combinations and elements, or equivalents thereof, by Letters Patent of United States:—

1. In a tank fitting for liquid level indicators for tanks, the combination of an air chamber open at its lower end and placed near the bottom of said tank, a tubular connection extending upwardly from the chamber, a top plate secured to said connection and forming therewith and with the chamber a single fitting, a baffle plate secured within the air chamber and projecting below the same whereby liquid will be diverted upwardly within said chamber.

2. In a tank fitting the combination of a tubular member formed with an enlarged end portion opening downwardly and having a baffle plate transversely arranged within and projecting substantially one-half its length below said enlarged end portion.

3. In a tank fitting the combination of a tank with an open ended air chamber near the bottom of the tank, a conduit extending from the air chamber, a baffle plate positioned within said chamber and secured thereto, said plate projecting below the bottom of the air chamber, the top of the baffle plate terminating below the top of said chamber thereby forming an unobstructed air space near the top of the air chamber wherein aerated liquid may circulate after being guided into said air space by said baffle plate.

In witness whereof, I hereunto subscribe my name.

MOSES E. CHENEY.

CERTIFICATE OF CORRECTION.

Patent No. 1,775,273. Granted September 9, 1930, to

MOSES E. CHENEY.

It is hereby certified that error appears in the above numbered patent requiring correction as follows: In the heading to the drawing and in the heading to the printed specification, date of original application filed should read "October 25, 1927" instead of October 25, 1928; and that the said Letters Patent should be read with this correction therein that the same may conform to the record of the case in the Patent Office.

Signed and sealed this 21st day of October, A. D. 1930.

(Seal)

M. J. Moore,
Acting Commissioner of Patents.